United States Patent
Henning et al.

(10) Patent No.: US 11,493,436 B2
(45) Date of Patent: Nov. 8, 2022

(54) METHOD FOR MANUFACTURING GAS CONCENTRATION CALCULATION DEVICE AND GAS CONCENTRATION CALCULATION DEVICE

(71) Applicant: ASAHI KASEI MICRODEVICES CORPORATION, Tokyo (JP)

(72) Inventors: Jan-Åke Henning, Delsbo (SE); Carl-Johan Hed, Delsbo (SE); Jan Wigg, Delsbo (SE)

(73) Assignee: Asahi Kasel Microdevices Corporation, Tokyo (JP)

( * ) Notice: Subject to any disclaimer, the term of this patent is extended or adjusted under 35 U.S.C. 154(b) by 0 days.

(21) Appl. No.: 17/114,546

(22) Filed: Dec. 8, 2020

(65) Prior Publication Data

US 2021/0172869 A1  Jun. 10, 2021

(30) Foreign Application Priority Data

Dec. 9, 2019  (JP) .............................. JP2019-222115

(51) Int. Cl.
*G01N 21/3504*  (2014.01)

(52) U.S. Cl.
CPC ... *G01N 21/3504* (2013.01); *G01N 2201/061* (2013.01)

(58) Field of Classification Search
CPC ...................... G01N 21/3504; G01N 2201/061
See application file for complete search history.

(56) References Cited

U.S. PATENT DOCUMENTS

| | | | |
|---|---|---|---|
| 2008/0061238 A1* | 3/2008 | Hok | G01N 33/497 250/340 |
| 2016/0356764 A1* | 12/2016 | Martin | G01N 21/3504 |

FOREIGN PATENT DOCUMENTS

JP          5502269 B2      3/2014

* cited by examiner

*Primary Examiner* — Jamil Ahmed
(74) *Attorney, Agent, or Firm* — Morgan, Lewis & Bockius LLP

(57) ABSTRACT

A method for manufacturing a gas concentration calculation device including a housing made of a synthetic resin and configured to include a cylindrical portion including first and second openings, respectively, at axial both ends thereof, and first and second mirrors, respectively, arranged facing each other at the first and second openings to form an optical path of infrared light inside the cylindrical portion. The method includes a step of preparing a precursor including respective sticking-out portions made of a synthetic resin sticking more outward than respective installation positions of first and second mirrors in a cylindrical portion and a step of bonding the first and second mirrors to the respective installation positions by arranging the first and second mirrors, respectively, at the respective installation positions of the precursor and then bending the sticking-out portions while melting with heat to cause them to adhere to the first and second mirrors.

8 Claims, 8 Drawing Sheets

METHOD FOR MANUFACTURING GAS CONCENTRATION CALCULATION DEVICE AND GAS CONCENTRATION CALCULATION DEVICE

CROSS REFERENCE TO RELATED APPLICATIONS AND INCORPORATION BY REFERENCE

This application claims benefit of priority under 35 USC 119 based on Japanese Patent Application No. 2019-222115 filed on Dec. 9, 2019, the entire contents of which are incorporated by reference herein.

TECHNICAL FIELD

The present invention relates to a gas concentration calculation device.

BACKGROUND ART

A gas concentration calculation device described in JP 5502269 B is a gas concentration calculation device using a non-dispersive infrared (NDIR) method that non-dispersively applies light emitted from a light source to a specimen sample and measures a change in an infrared light intensity having a specific wavelength. The gas concentration calculation device described in JP 5502269 B is a system for detecting and analyzing a plurality of volatile substances contained in a breadth sample of a subject. The system includes at least one source of infrared light adapted to a wavelength range of specific absorption peaks of the volatile substances, a plurality of reflecting surfaces for the infrared light configured for collimation, and at least one detector providing a plurality of electrical output signals corresponding to transmitted light of the infrared light in wavelength intervals corresponding to the absorption peaks. The system further includes at least one measuring cell including a mechanical support structure for determining positions of the light source of the infrared light, the reflecting surfaces, and the detector, configured to perform reception and disposal of the breadth sample, and exposing the breadth sample to the infrared light and at least one electronic signal processing unit capable of analyzing the electrical output signal according to pre-programmed information regarding infrared absorption spectra of the volatile substances.

A response of the system is displayed or otherwise notified, and perceived substantially immediately. The breath sample is collected in free air in a close vicinity of the subject. The measuring cell includes an inlet opening and an outlet opening sufficiently large in cross-sectional area to maintain a laminar airflow of breadth in the measuring cell. Additionally, one of the volatile substances is carbon dioxide. Measurement of carbon dioxide concentration in the close vicinity of the subject is performed in combination with an estimated value of alveolar carbon dioxide concentration to determine the degree of dilution of the breath sample.

SUMMARY

Gas concentration calculation devices are required to be miniaturized. With design of an optical path using a high-level optical technology, skillful use of reflection allows a long optical path length to be obtained inside a small housing, which increases the amount of light absorbed by a gas in the housing, whereby both miniaturization and high accuracy can be achieved.

However, in a gas concentration calculation device including a cylindrical portion made of a synthetic resin and including a first opening and a second opening, respectively, at axial both ends thereof and a first mirror and a second mirror, respectively, arranged facing each other at the first opening and the second opening to form an optical path of infrared light in the cylindrical portion, the optical path can be distorted and analysis accuracy can be reduced due to a misalignment that may occur when fixing the first and second mirrors to the cylindrical portion.

An object of the present invention is to provide a method for manufacturing a gas concentration calculation device including a cylindrical portion made of a synthetic resin and including a first opening and a second opening, respectively, at axial both ends of the cylindrical portion and a first mirror and a second mirror, respectively, arranged facing each other at the first and second openings to form an optical path of infrared light inside the cylindrical portion, which method hardly causes misalignment when fixing the first and second mirrors to the cylindrical portion.

To achieve the above object, a first aspect of the present invention is a method for manufacturing a gas concentration calculation device, including the following structures (1) to (4):

(1) The method is a method for manufacturing a gas concentration calculation device for calculating a concentration of a gas by a method of applying light emitted from a light source to a specimen sample and measuring a change in an infrared light intensity having a specific wavelength.

(2) The gas concentration calculation device includes a housing made of a synthetic resin and configured to include a cylindrical portion including a first opening and a second opening, respectively, at axial both ends of the cylindrical portion and a first mirror and a second mirror, respectively, arranged facing each other at the first and second openings to form an optical path of infrared light inside the cylindrical portion.

(3) The method includes a step of preparing a precursor as the precursor of the housing, the precursor including respective sticking-out portions made of the synthetic resin and sticking axially more outward than respective installation positions of the first and second mirrors in the cylindrical portion.

(4) The method includes a step of fixing the first and second mirrors to the respective installation positions by arranging the first and second mirrors, respectively, at the respective installation positions in the precursor and then bending the sticking-out portions while melting with heat to cause the sticking-out portions to adhere to the first and second mirrors.

A second aspect of the present invention is a gas concentration calculation device including the following structures (11) to (13):

(11) The gas concentration calculation device is a gas concentration calculation device for calculating a concentration of a gas by a method of applying light emitted from a light source to a specimen sample and measuring a change in an infrared light intensity having a specific wavelength.

(12) The gas concentration calculation device includes a housing made of a synthetic resin and configured to include a cylindrical portion including a first opening and a second opening, respectively, at axial both ends of the cylindrical portion, and a first mirror and a second mirror, respectively, arranged facing each other at the first and second openings to form an optical path of infrared light inside the cylindrical portion.

(13) The first and second mirrors are fixed to the cylindrical portion by the synthetic resin forming the cylindrical portion adhering to outer surface peripheral edges of the first and second mirrors in such a manner as to turn from the first and second openings to the outer surface peripheral edges of the first and second mirrors.

According to the method for manufacturing a gas concentration calculation device according to the present invention, misalignment can be suppressed when fixing the first and second mirrors to the cylindrical portion.

DETAILED DESCRIPTION

While embodiments of the present invention will be described hereinbelow, the present invention is not limited to the embodiments given below. The following embodiments describe technologically preferable limitations to implement the invention, but these limitations are not essential requirements of the invention.

[Structure of Gas Concentration Calculation Device]

Figure 1:
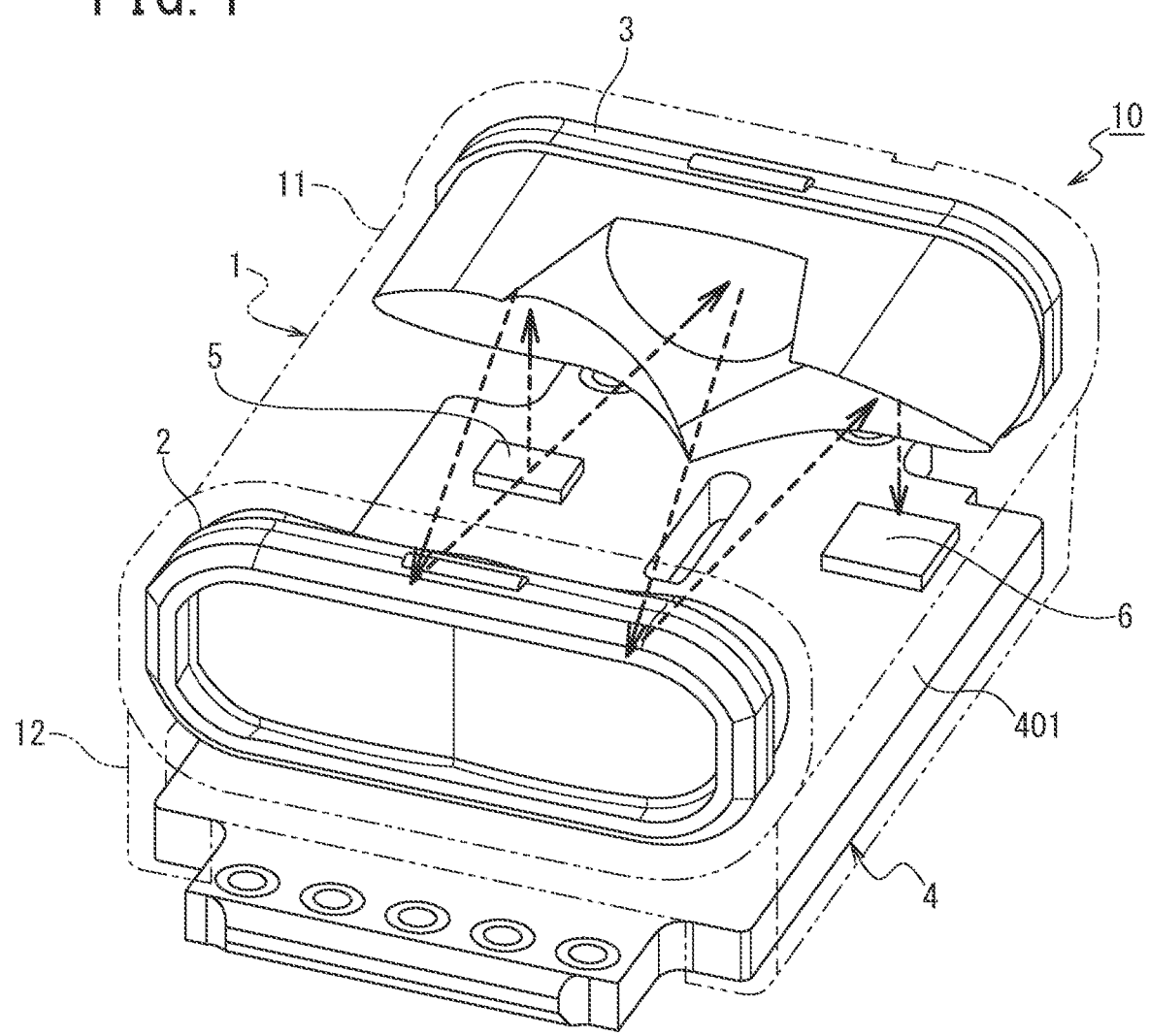
FIG. 1 is a schematic perspective view illustrating a gas concentration calculation device of an embodiment of the present invention.

As illustrated in FIG. 1, a gas concentration calculation device 10 of the present embodiment is a gas concentration calculation device for calculating a concentration of a gas by a method of non-dispersively applying light emitted from a light source to a specimen sample and measuring a change in an infrared light intensity having a specific wavelength, and includes a housing 1 made of a synthetic resin (LCP) including a cylindrical portion 11, a first mirror 2, a second mirror 3, and a substrate 4.

The first mirror 2 and the second mirror 3, respectively, are arranged facing each other at axial both ends of the cylindrical portion 11. The first and second mirrors 2 and 3 each include a mirror surface layer formed on a mirror main body formed into a predetermined shape using PPS (a synthetic resin different from the synthetic resin forming the cylindrical portion 11). The first and second mirrors 2 and 3 form an optical path of infrared light inside the cylindrical portion 11.

An infrared light emitting element 5 and an infrared light detecting element 6 are arranged on a front surface 401 of the substrate 4. The substrate 4 is fixed to a frame-shaped portion 12 integrally formed with the cylindrical portion 11.

Infrared light emitted from the infrared light emitting element 5 is reflected a plurality of times between the first mirror 2 and the second mirror 3, and then received by the infrared light detecting element 6.

In the gas concentration calculation device 10 of the present embodiment, infrared light having a specific wavelength emitted from the infrared light emitting element 5 is absorbed by a gas taken inside the cylindrical portion 11, as a result of which an infrared light intensity detected by the infrared light detecting element 6 is reduced. Measuring the change in the infrared light intensity enables, for example, detection of alcohol concentration contained in breath.

The gas concentration calculation device 10 of the present embodiment is, for example, a device capable of detecting alcohol concentration in breath by analyzing the breath, to which "a system for detecting and analyzing a plurality of volatile substances contained in the breath sample of a subject" described in JP 5502269 B is applied. This device will allow alcohol concentration in breath to be appropriately estimated using the breadth introduced in the cylindrical portion 11 from a breath intake hole, without use of a mouthpiece.

[Precursor of Housing]

Figure 2:
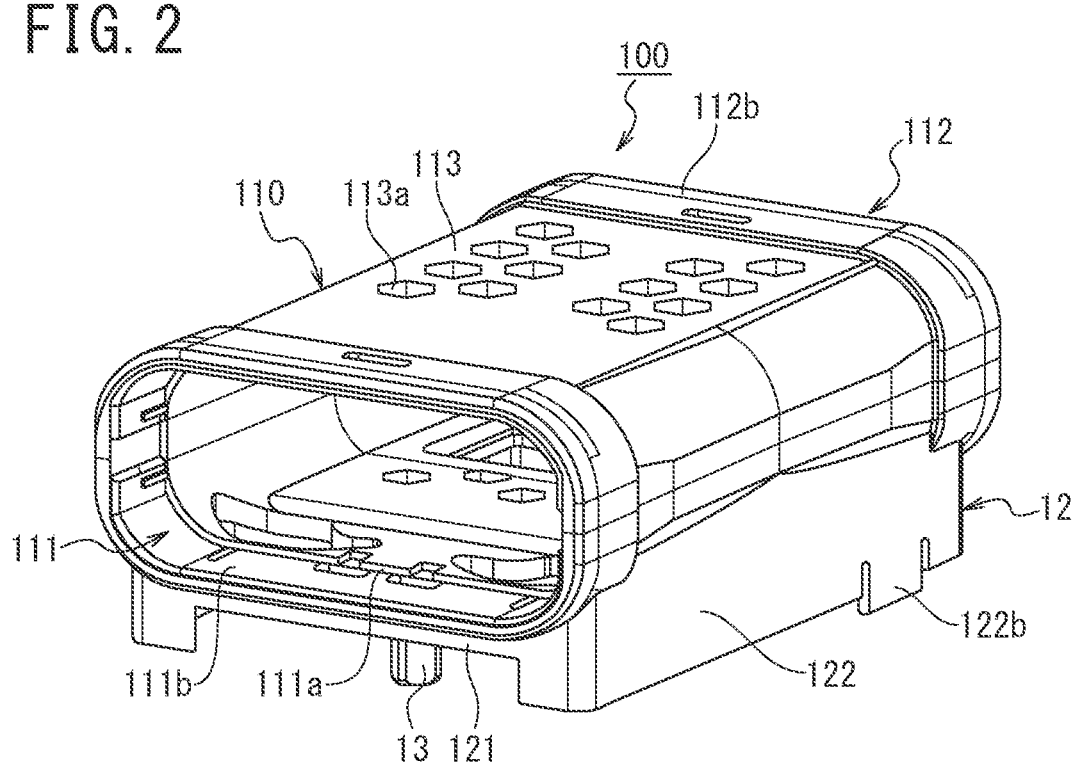
FIG. 2 is a perspective view illustrating a precursor of a housing for use in a method for manufacturing the gas concentration calculation device of the embodiment.
Figure 3:
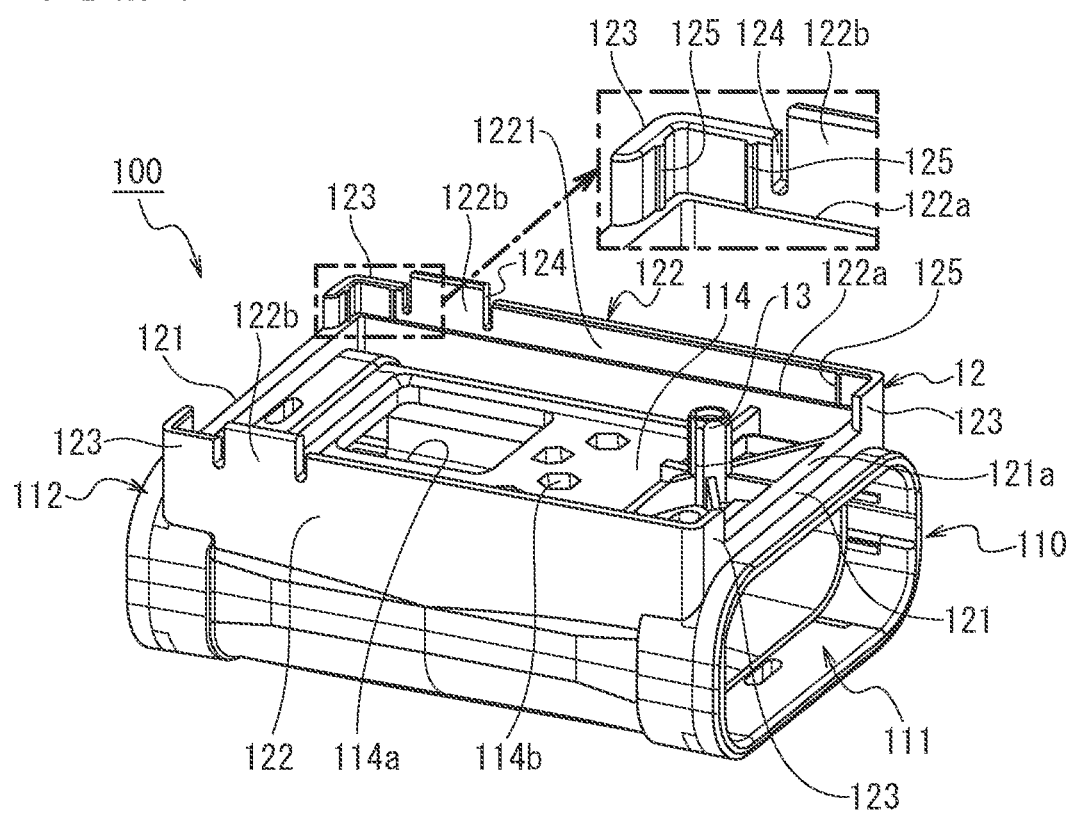
FIG. 3 is a perspective view illustrating the precursor of the housing for use in the method for manufacturing the gas concentration calculation device of the embodiment, which perspective view illustrates a side to which a substrate is to be fixed.

In a method for manufacturing the gas concentration calculation device 10 of the present embodiment, first, a precursor 100 illustrated in FIGS. 2 and 3 is prepared as the precursor of the housing 1.

As illustrated in FIGS. 2 and 3, the precursor 100 includes a portion 110 being a cylindrical portion of the housing 1, a frame-shaped portion 12 integrally formed with the portion 110 being the cylindrical portion thereof, and a positioning pin 13.

The portion 110 being the cylindrical portion includes a first opening 111 at an axial one end thereof and a second opening 112 at an axial other end thereof. On an inner surface of the first opening 111 is formed a stepped surface 111a to be a reference of an installation position of the first mirror 2. A portion located axially more outward than the stepped surface 111a is thin in thickness. The first opening 111 includes a sticking-out portion 111b sticking more outward than the installation position of the first mirror 2. The second opening 112 also has the same shape. An axially perpendicular cross-sectional shape of the portion 110 being the cylindrical portion is a rectangle with arc-shaped four corners.

The portion 110 being the cylindrical portion includes a first plate-shaped portion 113 and a second plate-shaped portion 114 including a plane including long sides of the rectangle (an axially parallel plate surface: a plate surface parallel to an axis penetrating through the first opening 111 and the second opening 112), and a plurality of gas intake holes 113a are formed in the first plate-shaped portion 113. Additionally, in the second plate-shaped portion 114, a quadrangular arrangement hole (first hole) 114a for arranging the infrared light emitting element 5, the infrared light detecting element 6, and the like formed on the substrate 4 in the cylindrical portion 11, a hexagonal hole 114b for increasing a speed of switching between gasses outside and inside the cylindrical portion, and the positioning pin 13 for use in positioning between the precursor 100 and the substrate 4 are formed. The gas intake holes 113a penetrate through the first plate-shaped portion 113, and the arrangement hole 114a and the hexagonal hole 114b penetrate through the second plate-shaped portion 114.

The frame-shaped portion 12 of the precursor 100 is formed in such a manner as to protrude outward from the second plate-shaped portion 114 of the portion 110 being the cylindrical portion. The frame-shaped portion 12 includes a pair of front plates 121 arranged on axial both end sides of the cylindrical portion 11, a pair of side plates 122 arranged on widthwise both end sides of the cylindrical portion 11, and boundary portions 123 between both thereof. The front plates 121 are smaller in protrusion size than the side plates 122. The boundary portions 123 are portions that are continuous from the side plates 122 and that turn perpendicularly to the front plate 121 sides, and are the same in protrusion size as the side plates 122. A lower surface 121a that is a surface of the front plate 121 on an opposite side to the portion 110 being the cylindrical portion is present between the adjacent boundary portions 123 and is a surface that contacts a peripheral edge of the front surface 401 (the surface provided with the elements) of the substrate 4.

On an inner surface of each side plate 122, an edge surface 122a present in the same plane as the lower surface 121a of the front plate 121 is formed in an entire longitudinal direction of the side plate 122. On the axial other end (hereinafter also referred to simply as "axial") side of the side plate 122 of the portion 110 being the cylindrical portion, a protruding piece 122b that is larger in protrusion size than other portions of the side plate 122 is formed via a pair of notches 124. Each notch 124 is formed with a depth down to right before the edge surface 122a. On an axial other end side with respect to the notch 124 on the boundary portion 123 side, a protruding portion 125 that extends from a protruding end of the side plate 122 to the edge surface 122a is formed. The protrusion size of the protruding portion 125 is the same as a width of the edge surface 122a.

[Step of Fixing Mirrors]

Figure 4A:
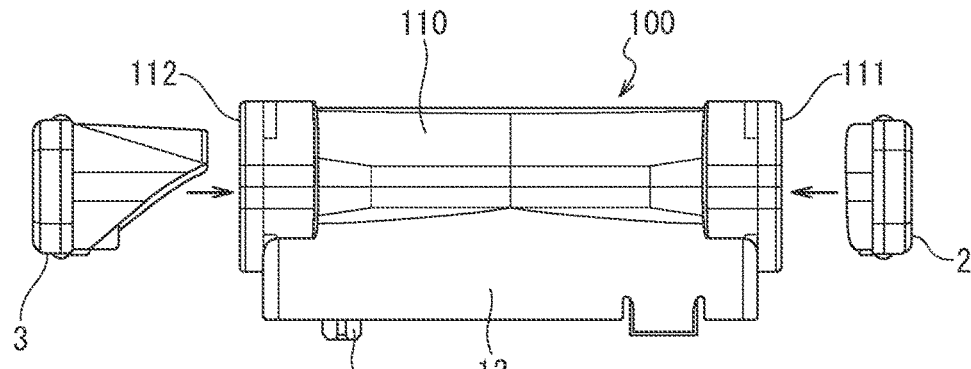
FIGS. 4A to 4D are diagrams illustrating steps of fixing mirrors to a cylindrical portion of the precursor in the method for manufacturing the gas concentration calculation device of the embodiment.
Figure 4B:
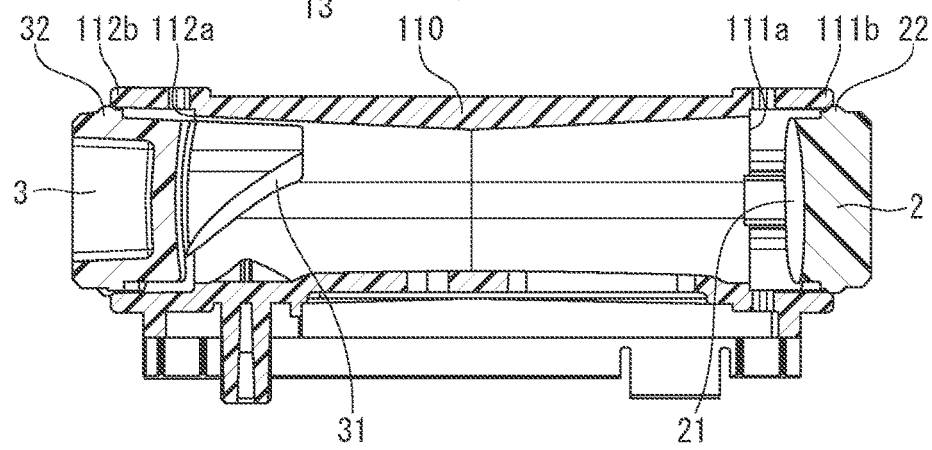

In the method for manufacturing the gas concentration calculation device 10 of the present embodiment, next, a step of fixing the first and second mirrors 2 and 3 to the portion 110 being the cylindrical portion is performed by the following method. The method will be described with reference to FIGS. 4A to 4D. FIG. 4A is a side view, and FIG. 4B to 4D are cross-sectional views along a widthwise center of the housing 1.

As illustrated in FIG. 4A, first, the first mirror 2 is inserted into the portion 110 being the cylindrical portion from the first opening 111, and the second mirror 3 is inserted into the portion 110 being the cylindrical portion from the second opening 112. In this case, as illustrated in FIG. 4B, an outer peripheral protruding portion 22 provided at an end on an opposite side to a reflecting surface 21 of the first mirror 2 is pressed against and into an inner surface of the sticking-out portion 111b of the first opening 111. Similarly, an outer peripheral protruding portion 32 provided at an end on an opposite side to a reflecting surface 31 of the second mirror 3 is pressed against and into an inner surface of the sticking-out portion 112b of the second opening 112.

Figure 4C:
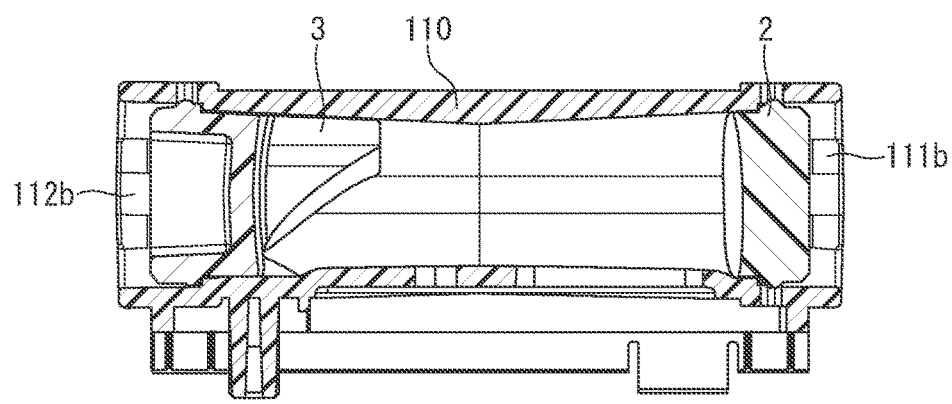
Figure 4D:
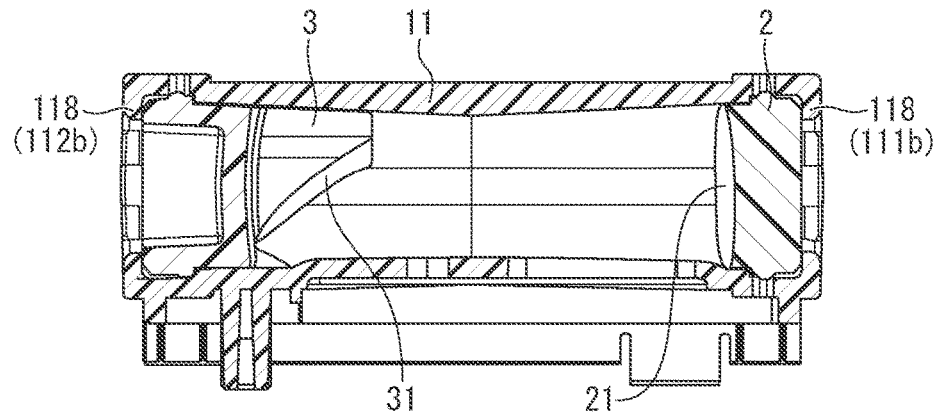

By doing this, the first mirror 2 enters into the first opening 111 of the portion 110 being the cylindrical portion until the outer peripheral protruding portion 22 comes in contact with the stepped surface 111a, as illustrated in FIG. 4C. Similarly, the second mirror 3 enters into the second opening 112 of the portion 110 being the cylindrical portion until the outer peripheral protruding portion 32 comes in contact with the stepped surface 112a. As a result, the first mirror 2 is arranged at a position more inward than the sticking-out portion 111b, and the second mirror 3 is arranged at a position more inward than the sticking-out portion 112b of the second opening 112.

Next, in the state of FIG. 4C, by heating a die pressing from the first opening 111 side and the second opening 112 side of the portion 110 being the cylindrical portion, the sticking-out portions 111b and 112b are melted with heat, bent, and caused to adhere to the first mirror 2 and the second mirror 3.

As a result, the first mirror 2 and the second mirror 3 are fixed to the portion 110 being the cylindrical portion of the precursor 100. In other words, as illustrated in FIG. 4D, the LCP (the synthetic resin forming the cylindrical portion) adheres to the outer surface peripheral edges of the first mirror 2 and second mirrors 3 in such a manner as to turn from the first and second openings 111 and 112 to the outer surface peripheral edges of the first and second mirrors 2 and 3, thereby forming flange portions 118 made of the LCP. As a result, the portion 110 being the cylindrical portion of the precursor 100 becomes the cylindrical portion 11 of the housing 1.

[Step of Fixing Substrate]

Figure 5A:
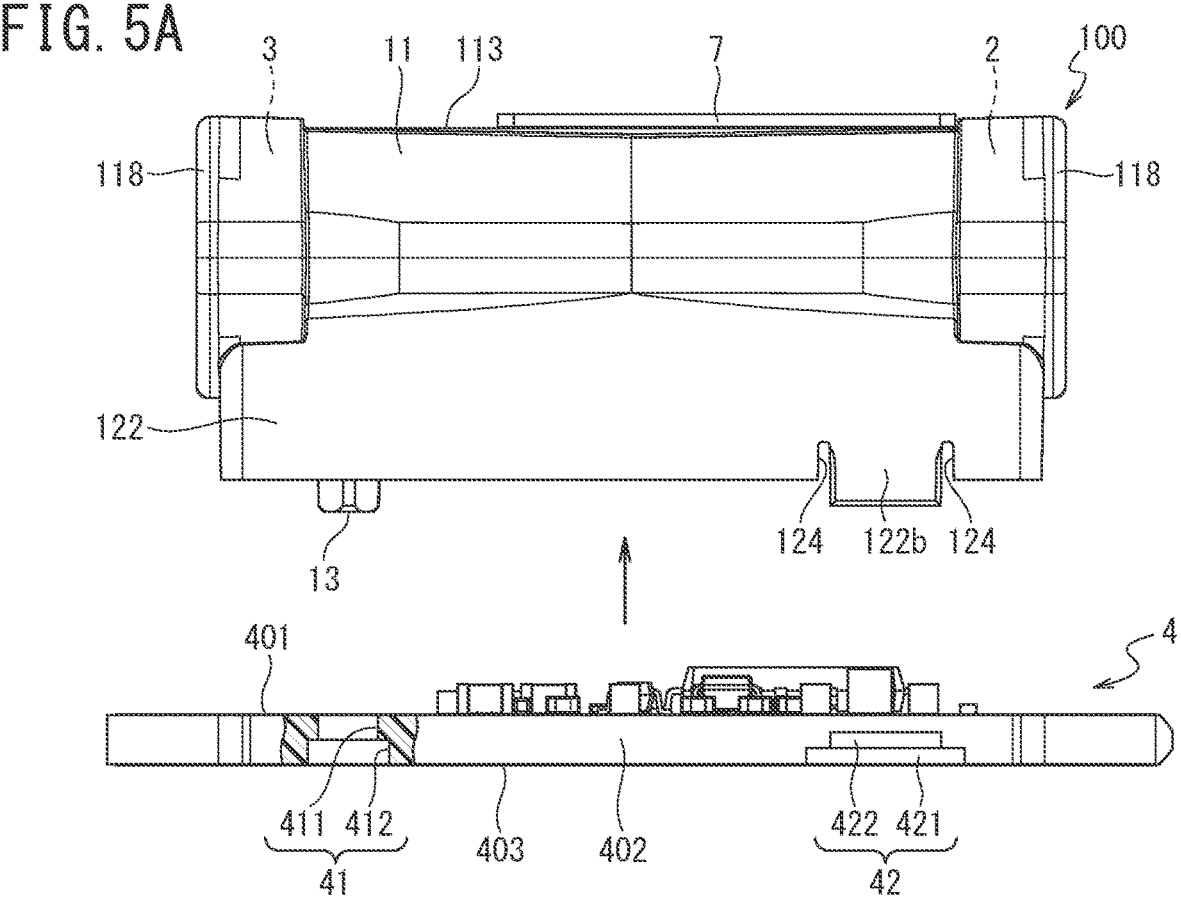
FIGS. 5A and 5B are diagrams illustrating steps of fixing the substrate to a frame-shaped portion of the precursor in the method for manufacturing the gas concentration calculation device of the embodiment.
Figure 5B:
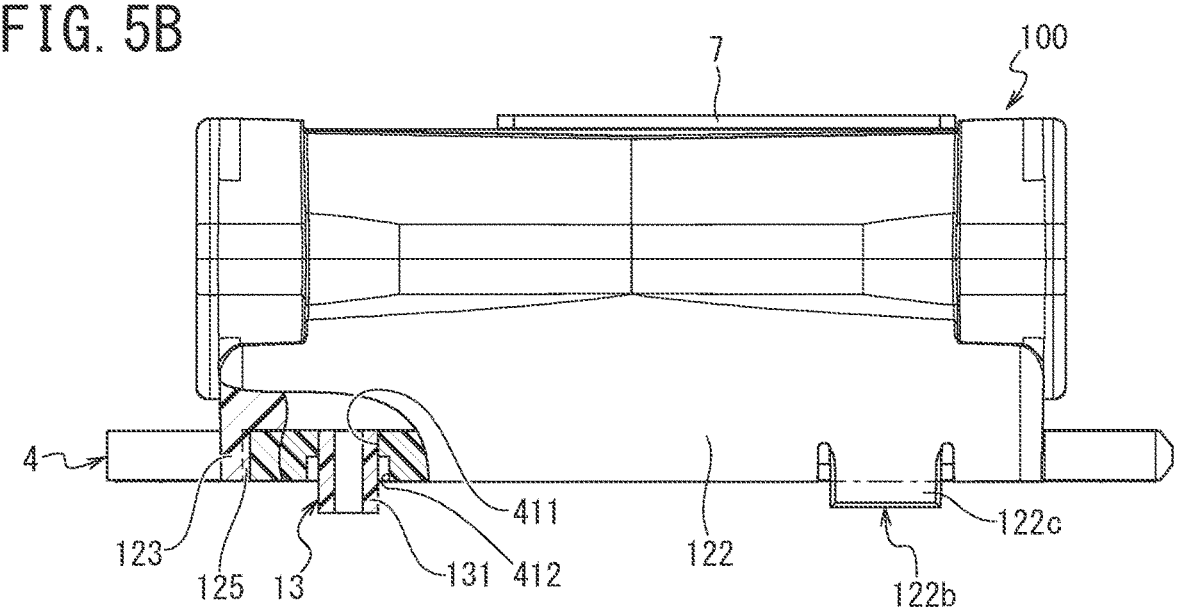
Figure 6:
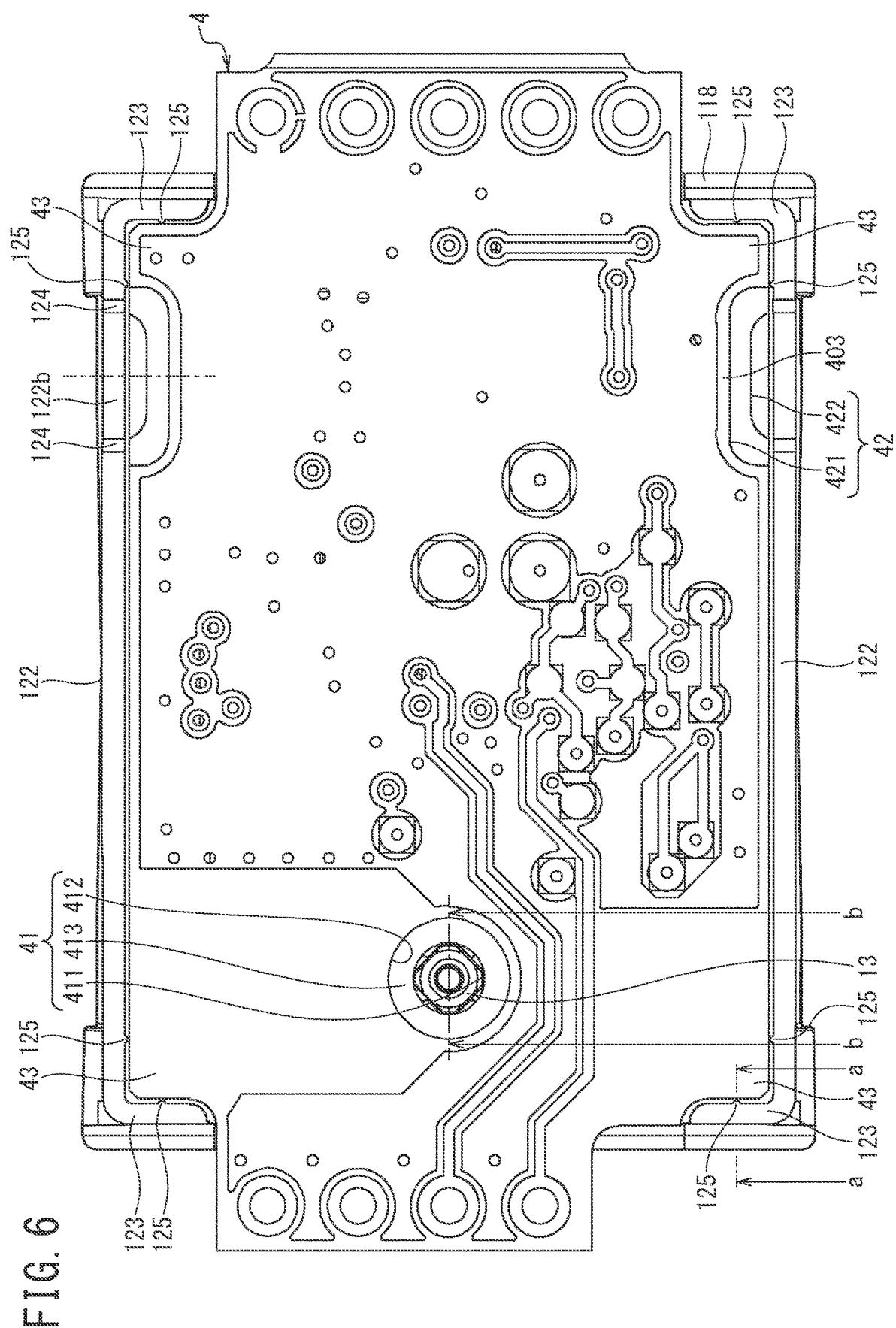
FIG. 6 is a diagram of FIG. 5B as viewed from the substrate side.
Figure 7:
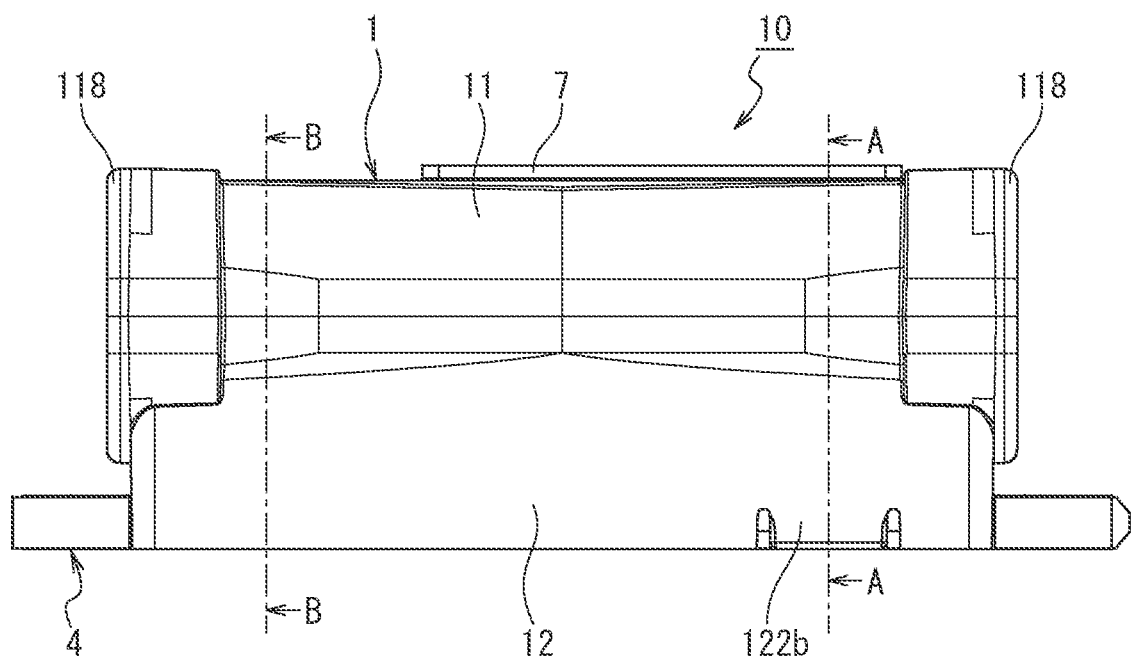
FIG. 7 is a side view illustrating the gas concentration calculation device of the embodiment.

Then, a step of fixing the substrate 4 to the precursor 100 is performed by the following method. The method will be described with reference to FIGS. 5A, 5B and 6. Note that cross sections of broken parts of FIG. 5B are those corresponding to a cross section taken along line a-a of FIG. 6 and a cross section taken along line b-b of FIG. 6. As illustrated in FIG. 5A and FIG. 6, in the in-plane of the substrate 4, a positioning hole (a second hole) 41 for allowing the positioning pin 13 to penetrate therethrough is formed at a position corresponding to the positioning pin 13 of the precursor 100. The positioning hole 41 includes a small diameter portion 411 having a slightly larger diameter than the diameter of the positioning pin 13 and a large diameter portion 412 having a sufficiently larger diameter than the diameter of the positioning pin 13, with a stepped surface 413 provided between the small diameter portion 411 and the large diameter portion 412.

Additionally, on a side surface 402 of the substrate 4, a notch 42 extending from the side surface 402 to a peripheral edge of a back surface 403 is formed at a position corresponding to the protruding piece 122b of the frame-shaped portion 12 of the precursor 100. The notch 42 is formed stepwise, and includes a first portion 421 having a large notch size from the side surface 402 and a small notch size from the back surface 403 and a second portion 422 having a small notch size from the side surface 402 and a large notch size from the back surface 403.

First, a plate-shaped lid 7 is installed outside the first plate-shaped portion 113 of the precursor 100 to protect the gas intake holes 113a. Next, the substrate 4 is inserted into the frame-shaped portion 12 with the front surface 401 side of the substrate 4 directed toward the frame-shaped portion 12 side of the precursor 100. In this case, the positioning pin 13 of the precursor 100 is inserted into the positioning hole 41 of the substrate 4, and four corners 43 of the substrate 4, respectively, are positioned by the pair of protruding portions 125 provided at the boundary portions 123 of the frame-shaped portion 12. FIG. 5B and FIG. 6 illustrate this state.

Next, a thermal welding method using a die is performed to change the state illustrated in FIGS. 5A and 5B to a state illustrated in FIGS. 7 to 10.

At this step, a portion 122c (a leading end portion of the protruding piece 122b of the protruding piece 122b sticking out from each side plate 122 of the frame-shaped portion 12 is bent while being melted with heat, then inserted into the notch 42 of the substrate 4, and caused to adhere to the peripheral edge of the back surface 403.

Simultaneously with this, a portion 131 (a leading end portion of the positioning pin 13) of the positioning pin 13 of the precursor 100 protruding from the substrate 4 is crushed while being melted with heat, then inserted into the large diameter portion 412 of the positioning hole 41 of the substrate 4, and caused to adhere to the stepped surface 413.

Figure 8:
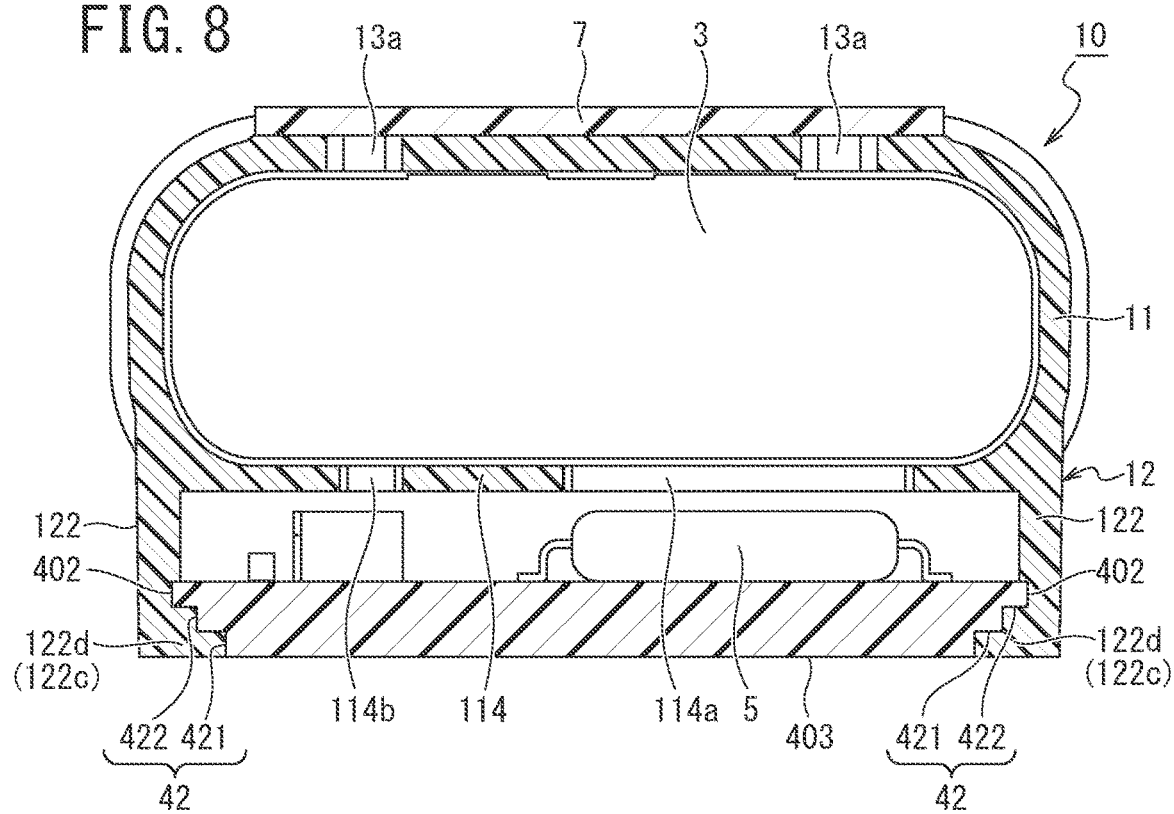
FIG. 8 is a cross-sectional view taken along line A-A of FIG. 7.
Figure 9:
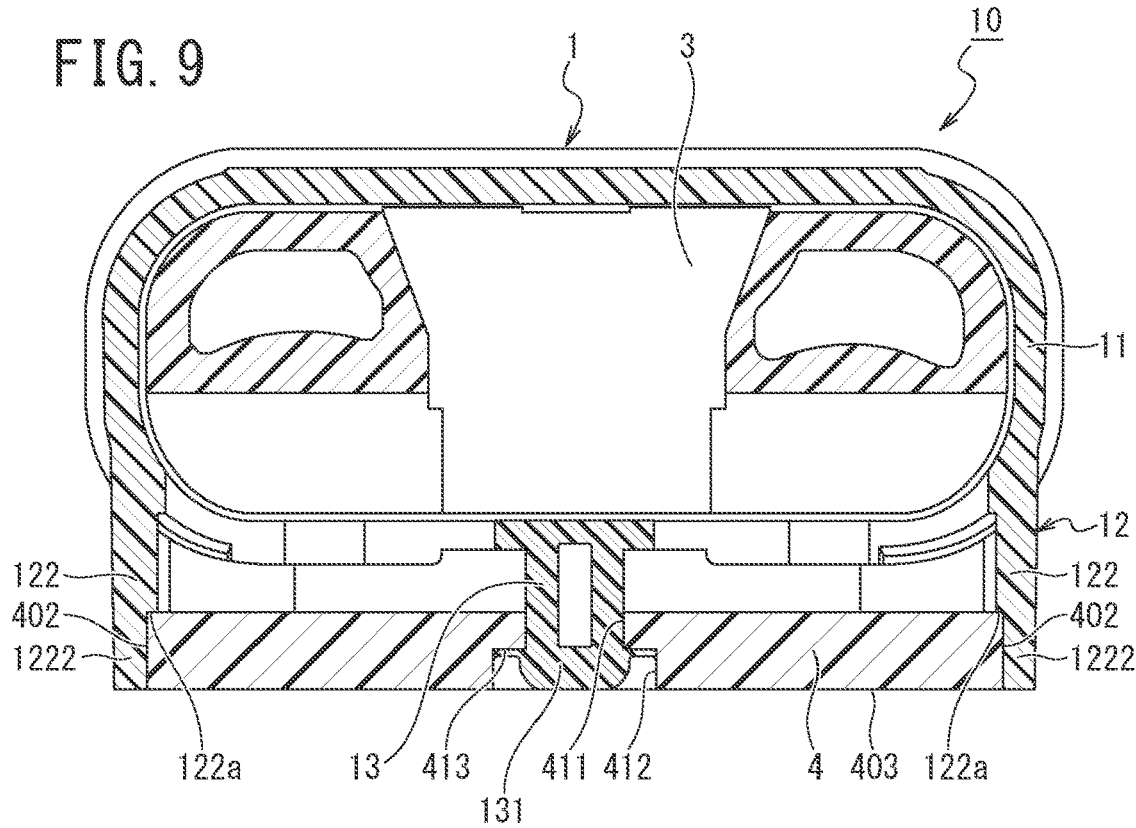
FIG. 9 is a cross-sectional view taken along line B-B of FIG. 7.
Figure 10:
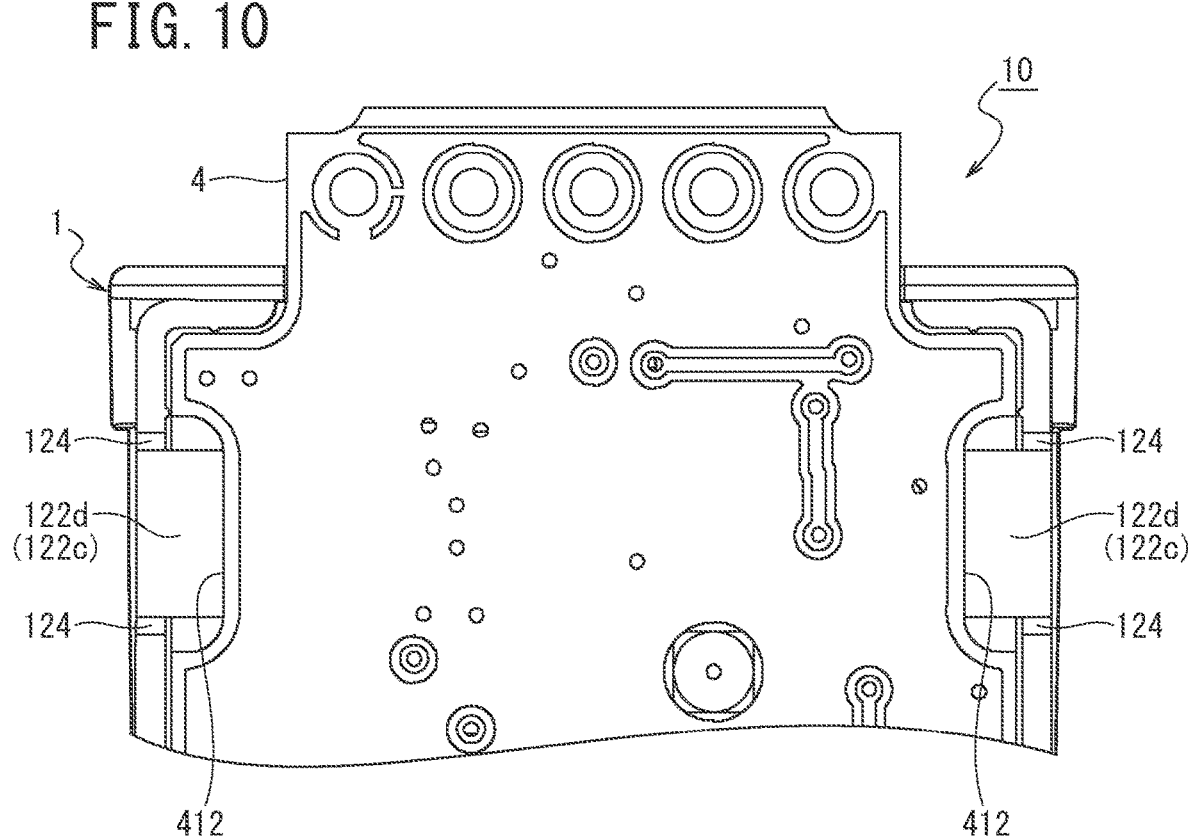
FIG. 10 is a diagram of a part of the gas concentration calculation device of the embodiment as viewed from the substrate side.

In this state, the synthetic resin forming the leading end portion 122c of the protruding piece 122b is melted with heat, and present as a lump 122d shaped along the shape of the notch 42, as illustrated in FIG. 8. Additionally, as illustrated in FIG. 9, the leading end portion 131 of the positioning pin 13 spreads axially outward when melted with heat and adheres to the stepped surface 413 of the positioning hole 41, thereby being brought into a bonding state similar to rivet bonding.

In this way, the LCP that is the synthetic resin forming the frame-shaped portion 12 and the positioning pin 13 is melted and adheres to the substrate 4, whereby the substrate 4 is fixed to the frame-shaped portion 12.

According to the method for manufacturing the gas concentration calculation device of the present embodiment, misalignment of the first and second mirrors with respect to the cylindrical portion can be suppressed as compared with use of an adhesive agent when fixing the first and second mirrors to the cylindrical portion. In addition, misalignment of the substrate with respect to the housing can be suppressed as compared with fixing of the substrate to the housing by fastening with screws.

Furthermore, in the method for manufacturing the gas concentration calculation device of the present embodiment, the first and second mirrors 2 and 3 and the substrate 4 are bonded to the housing 1 by the thermal welding of the synthetic resin (the material of the bonding objects) forming the precursor 100. Thus, as compared with bonding using a material other than that of the bonding objects, there occurs no problem due to an expansion coefficient difference caused by the presence of a material other than that of the bonding objects between the bonding objects. In addition, the method of the present embodiment can be performed by the quick and easy manufacturing technology, and therefore is suitable for mass production.

REFERENCE SIGNS LIST

10: Gas concentration calculation device
1: Housing
100: Precursor
110: Portion being cylindrical portion
11: Cylindrical portion
111: First opening
111a: Stepped surface to be reference of installation position of first mirror
111b: Sticking-out portion
112: Second opening
112b: Sticking-out portion
113: First plate-shaped portion
113a: Gas intake hole
114: Second plate-shaped portion
114a: Arrangement hole (first hole)
118: Flange portion (portion generated by thermal welding)
12: Frame-shaped portion
121: Front plate
121a: Lower surface of front plate (contact surface for contacting front surface of substrate)
122: Side plate
122a: Edge surface (contact surface for contacting front surface of substrate)
122b: Protruding piece
122c: Leading end portion of protruding piece
1222: Portion for covering side surface of substrate
123: Boundary portion
124: Notch
125: Protruding portion
13: Positioning pin
131: Leading end portion of positioning pin
2: First mirror
3: Second mirror
4: Substrate
401: Front surface of substrate
402: Side surface of substrate
403: Back surface of substrate
41: Positioning hole (second hole)
411: Small diameter portion
412: Large diameter portion
413: Stepped surface
42: Notch
421: First portion of notch
422: Second portion of notch
5: Infrared light emitting element
6: Infrared light detecting element
7: Lid

The invention claimed is:

1. A method for manufacturing a gas concentration calculation device for calculating a concentration of a gas by a method of applying light emitted from a light source to the gas and measuring infrared light having a specific wavelength, in which the gas concentration calculation device includes a housing made of a synthetic resin and configured to include a cylindrical portion, the cylindrical portion including a first opening and a second opening at both ends of the cylindrical portion, and a first mirror and a second mirror, respectively, arranged facing each other at the first and second openings to form an optical path of the infrared light inside the cylindrical portion, the method comprising:
a first step of preparing a precursor of the housing, the precursor including respective sticking-out portions made of the synthetic resin and sticking more outward than respective installation positions of the first and second mirrors in the cylindrical portion; and
a second step of fixing the first and second mirrors to the respective installation positions by arranging the first and second mirrors, respectively, at the respective installation positions and then bending the sticking-out portions while melting with heat to cause a bent portion of the sticking-out portions to adhere to at least a portion of an outer surface peripheral edge of a back surface of the respective first and second mirrors,
wherein the sticking-out portions include a first sticking-out portion formed at the first opening in a plate shape extending along a peripheral edge of the first opening and protruding axially and a second sticking-out portion formed at the second opening in a plate shape extending along a peripheral edge of the second opening and protruding axially, and wherein a surface of the plate-shaped first sticking-out portion adheres to the back surface of the first mirror and a surface of the plate-shaped second sticking-out portion adheres to the back surface of the second mirror.

2. The method for manufacturing a gas concentration calculation device according to claim 1, wherein the first and second mirrors each include a mirror surface layer formed on a mirror main body made of a synthetic resin different from the synthetic resin forming the cylindrical portion; and wherein at the second step, the sticking-out portions melted with heat are caused to adhere to the mirror main bodies of the first and second mirrors.

3. The method for manufacturing a gas concentration calculation device according to claim 1, the gas concentration calculation device including a substrate configured to include an infrared light emitting element and an infrared light detecting element on a front surface of the substrate, in which the cylindrical portion includes the plate-shaped portions that have a plate surface parallel to an axis penetrating through the first and second openings; in which the precursor includes a frame-shaped portion made of the synthetic resin integrally formed on a portion being the cylindrical portion, the frame-shaped portion protruding outward from the plate surface of the plate-shaped portion, and a positioning pin made of the synthetic resin protruding outward from the plate surface; in which the frame-shaped portion includes a contact surface for contacting a peripheral edge of a front surface of the substrate, a portion for covering a side surface of the substrate, and a protruding piece continuous to the covering portion and extending on an opposite side to the contact surface; in which the plate-shaped portion includes a first hole for arranging the infrared light emitting element and the infrared light detecting element inside the cylindrical portion, the first hole penetrating through the plate-shaped portion; and in which the substrate includes a second hole for causing the positioning pin to penetrate through the second hole, the method comprising a third step of fixing the substrate to the frame-shaped portion of the precursor by engaging the substrate with the frame-shaped portion of the precursor to arrange the infrared light emitting element and the infrared light detecting element in the first hole of the plate-shaped portion, contacting the peripheral edge of the front surface of the substrate with the contact surface of the frame-shaped portion, covering the side surface of the substrate with the covering portion of the frame-shaped portion, causing the positioning pin of the precursor to penetrate through the second hole of the substrate, and then deforming leading end portions of the positioning pin and the protruding piece of the frame-shaped portion while melting with heat to cause the leading end portion of the positioning pin to adhere to and be fixed to the second hole and also cause the leading end portion of the protruding piece to adhere to a peripheral edge of a back surface of the substrate.

4. A gas concentration calculation device for calculating a concentration of a gas by a method of applying light emitted from a light source to the gas and measuring infrared light having a specific wavelength, the device comprising:
a housing made of a synthetic resin and configured to include a cylindrical portion, the cylindrical portion including a first opening and a second opening at both ends of the cylindrical portion; and
a first mirror and a second mirror, respectively, arranged facing each other at the first and second openings to form an optical path of the infrared light inside the cylindrical portion, wherein the first and second mirrors are fixed to the cylindrical portion by the synthetic resin forming the cylindrical portion, the synthetic resin adhering to outer surface peripheral edges of the first and second mirrors in such a manner as to turn from the first and second openings to the outer surface peripheral edges of the first and second mirrors,
wherein the first opening includes a first sticking-out portion having a plate shape extending along a peripheral edge of the first opening and protruding axially and the second opening includes a second sticking-out portion having a plate shape extending along a peripheral edge of the second opening and protruding axially, and
wherein a surface of the plate-shaped first sticking-out portion adheres to the back surface of the first mirror and a surface of the plate-shaped second sticking-out portion adheres to the back surface of the second mirror.

5. The gas concentration calculation device according to claim 4, wherein the first and second mirrors each include a mirror surface layer formed on a mirror main body made of a synthetic resin different from the synthetic resin forming the cylindrical portion, and are fixed to the cylindrical portion by the synthetic resin forming the cylindrical portion adhering to the outer surface peripheral edges of the mirror main bodies of the first and second mirrors in such a manner as to turn from the first and second openings to the outer surface peripheral edges.

6. The gas concentration calculation device according to claim 4, comprising a substrate configured to include an infrared light emitting element and an infrared light detecting element on a front surface of the substrate,
wherein the cylindrical portion includes the plate-shaped portion including portions that have a plate surface parallel to an axis penetrating through the first and second openings,
wherein the housing includes a frame-shaped portion made of the synthetic resin integrally formed on the cylindrical portion, the frame-shaped portion protruding outward from the plate surface of the plate-shaped portion, and a positioning pin made of the synthetic resin protruding outward from the plate surface, and
wherein the frame-shaped portion includes a contact surface for contacting a peripheral edge of a front surface of the substrate and a portion for covering a side surface of the substrate, in which the infrared light emitting element and the infrared light detecting element are arranged in a first hole penetrating through the plate surface of the plate-shaped portion, the peripheral edge of the front surface of the substrate is contacted with the contact surface of the frame-shaped portion, the side surface of the substrate is covered with the covering portion of the frame-shaped portion, the positioning pin of the housing is caused to penetrate through a second hole penetrating through the substrate, and the substrate is fixed to the housing by the synthetic resin forming the frame-shaped portion adhering to a peripheral edge of a back surface of the substrate in such a manner as to turn from the frame-shaped portion to the peripheral edge and the synthetic resin forming the positioning pin adhering to the second hole.

7. The gas concentration calculation device according to claim 4, wherein the each of the first opening and second opening includes a plurality of circumferential surfaces including a first edge surface and a second edge surface opposing each other and a first side surface and a second side surface opposing each other,
- wherein a length of the first side surface and the second side surface is less than a length of the first edge surface and the second edge surface,
- wherein the first side surface and the second side surface each includes a first portion, a second portion, and a third portion, the second portion circumferentially separates the first portion and the third portion, and the second portion has a reduced thickness relative to the first portion and the third portion, and
- wherein an inner surface of the second portion of each of the first side surface and the second side surface are offset from and non-adhering to outer surface peripheral edges of the first and second mirrors.

8. The method for manufacturing a gas concentration calculation device according to claim 1, wherein the each of the first opening and second opening includes a plurality of circumferential surfaces including a first edge surface and a second edge surface opposing each other and a first side surface and a second side surface opposing each other,
- wherein a length of the first side surface and the second side surface is less than a length of the first edge surface and the second edge surface,
- wherein the first side surface and the second side surface each includes a first portion, a second portion, and a third portion, the second portion circumferentially separates the first portion and the third portion, and the second portion has a reduced thickness relative to the first portion and the third portion, and
- wherein, after the second step, an inner surface of the second portion of each of the first side surface and the second side surface are offset from and non-adhering to the outer surface peripheral edges of the back surface of the respective first and second mirrors.

* * * * *